(12) United States Patent
Yan et al.

(10) Patent No.: US 12,467,574 B2
(45) Date of Patent: Nov. 11, 2025

(54) DEFORMABLE TRACKED PIPELINE ROBOT AND DIFFERENTIAL TURNING METHOD THEREOF

(71) Applicant: North University of China, Taiyuan (CN)

(72) Inventors: Hongwei Yan, Taiyuan (CN); Hongmei Wei, Taiyuan (CN); Qi Chang, Taiyuan (CN); Guorui Wang, Taiyuan (CN); Kamel Aiman, Taiyuan (CN); Hailong Niu, Taiyuan (CN); Fujie Wang, Taiyuan (CN); Pengfei Yan, Taiyuan (CN); Pengyang Zhao, Taiyuan (CN); Bolong He, Taiyuan (CN); Hong Huo, Taiyuan (CN)

(73) Assignee: North University of China, Taiyuan (CN)

( * ) Notice: Subject to any disclaimer, the term of this patent is extended or adjusted under 35 U.S.C. 154(b) by 0 days.

(21) Appl. No.: 19/050,023

(22) Filed: Feb. 10, 2025

(65) Prior Publication Data

US 2025/0180152 A1    Jun. 5, 2025

(30) Foreign Application Priority Data

Jun. 7, 2024   (CN) .......................... 202410734878.1

(51) Int. Cl.
   *F16L 55/32*   (2006.01)
   *B62D 55/065*   (2006.01)
(52) U.S. Cl.
   CPC ............ *F16L 55/32* (2013.01); *B62D 55/065* (2013.01)

(58) Field of Classification Search
   None
   See application file for complete search history.

(56) References Cited

U.S. PATENT DOCUMENTS

| | | | |
|---|---|---|---|
| 2012/0215348 A1* | 8/2012 | Skrinde | B25J 9/163 |
| | | | 701/2 |
| 2019/0226620 A1* | 7/2019 | Weisenberg | F16L 55/1645 |

(Continued)

FOREIGN PATENT DOCUMENTS

| | | | | |
|---|---|---|---|---|
| CN | 104477264 A | | 4/2015 | |
| CN | 109611640 A | * | 4/2019 | ............. F16L 55/32 |

(Continued)

*Primary Examiner* — Navid Z. Mehdizadeh
*Assistant Examiner* — Jason R Roberson (57) ABSTRACT

Provided are a deformable tracked pipeline robot, and a differential turning method thereof. The deformable tracked pipeline robot includes a robot main body. Three tracked foot modules in a circular array are arranged on an outer side surface of the robot main body, each tracked foot module is connected to the robot main body through a center variable-diameter module. A spacing between the tracked foot module and the robot main body can be adjusted through the center variable-diameter module, making all three tracked foot modules in contact with an inner wall of a pipeline. According to a differential turning method based on space curve measurement, the pipeline robot can pass through pipelines with various curvature radii. A pipeline axis is measured by a Charge Coupled Device camera module as a bending curvature of a space curve. The accuracy of space curve fitting is improved by a recursive algorithm.

6 Claims, 9 Drawing Sheets

(56) References Cited

U.S. PATENT DOCUMENTS

2021/0025533 A1\* 1/2021 Duncan .................. F16L 55/30
2021/0148503 A1\* 5/2021 Fekrmandi .............. F16L 55/34

FOREIGN PATENT DOCUMENTS

| CN | 112901899 A | 6/2021 |
| CN | 114458868 A | 5/2022 |
| JP | 2015221635 A | 12/2015 |

\* cited by examiner

DEFORMABLE TRACKED PIPELINE ROBOT AND DIFFERENTIAL TURNING METHOD THEREOF

CROSS-REFERENCE TO RELATED APPLICATION

This patent application claims the benefit and priority of Chinese Patent Application No. 202410734878.1 filed with the China National Intellectual Property Administration on Jun. 7, 2024, the disclosure of which is incorporated by reference herein in its entirety as part of the present application.

TECHNICAL FIELD

The present disclosure belongs to the technical field of pipeline robots, and in particular to a deformable tracked pipeline robot, and a differential turning method thereof.

BACKGROUND

Pipelines as an important part of infrastructure in modern industry and city, are widely used to transport various substances, such as water, oil, and natural gas. Efficient and safe operation of the pipeline is crucial to the economy and public safety. With the passage of time, there may be problems such as corrosion, scaling and blockage inside the pipeline, and these problems can affect the normal function of the pipeline. These problems not only reduce the efficiency of the pipeline, but also can lead to environmental pollution and safety accidents, thus requiring regular inspection. The pipeline robot can carry various sensors into the pipeline to complete the tasks, but the complex environment inside the pipeline, such as narrow space, curvature and obstacles, brings challenges to the design and operation of the robot. When the pipeline robot passes through pipelines with different curvature radii and pipelines with obstacles, the travel path of the robot in the pipeline is more complicated, and it is difficult for the robot to pass through such pipelines.

SUMMARY

To overcome the disadvantages in the prior art, the present disclosure provides a deformable tracked pipeline robot and a differential turning method thereof to solve the problem that the existing pipeline robot is difficult to pass through pipelines with different curvature radii and pipelines with obstacles.

To achieve the objective above, the present disclosure is implemented through the following technical solutions.

A deformable tracked pipeline robot includes a robot main body, and three tracked foot modules in a circular array are circumferentially arranged on an outer side surface of the robot main body. Each of the three tracked foot modules is connected to the robot main body through a center variable-diameter module, and a spacing between the each of the three tracked foot module and the robot main body is adjusted through the center variable-diameter module, making the three tracked foot modules all in contact with an inner wall of the pipeline.

Each of the three tracked foot modules includes two main side plates called a first main side plate and a second main side plate parallel to each other. A driving support leg module is arranged between two ends of the two main side plates, a driven support leg module is arranged between an other ends of the two main side plates, and the driving support leg module is connected to the driven support leg module through a synchronous belt transmission mechanism. Tracked wheels are arranged in interiors of both the driving support leg module and the driven support leg module. The tracked wheels of the driving support leg module and the driven support leg module are sleeved with a same track. A driving motor is arranged on the first main side plate at the driving support leg module, and a brake is arranged on the first main side plate at the driven support leg module.

When the brake is in a power-on locking state, the synchronous belt transmission mechanism stops running, and the driving motor controls the tracked wheel inside the driving support leg module to rotate to drive the track to run. When the brake is in a power-off unlocking state, the synchronous belt transmission mechanism starts running, and the driving motor controls the driving support leg module to rotate integrally, and the driving support leg module drives the driven support leg module to rotate synchronously through the synchronous belt transmission mechanism.

In some embodiments, the driving support leg module includes two driving side plates called a first driving side plate and a second driving side plate. The two driving side plates are located between the two main side plates, and the two driving side plates are fixedly connected to each other through a plurality of connecting rods. A first tracked wheel is rotatably arranged between ends of the two driving side plates, and a second tracked wheel is rotatably arranged between other ends of the two driving side plates. A driven spur gear is fixedly arranged on a rotating shaft of the first tracked wheel, and a driven spur gear rotates synchronously with the first tracked wheel. The driving motor is fixedly arranged on an outer side surface of the first main side plate close to the driving support leg module, a driving bevel gear is fixedly arranged on an output shaft of the driving motor, an input shaft is rotatably arranged at the first main side plate, a driven bevel gear is fixedly arranged at an outer end of the input shaft, and the driving bevel gear is meshed with the driven bevel gear.

In some embodiments, an inner end of the input shaft extends between the two driving side plates, a driving spur gear is fixedly arranged at the inner end of the input shaft, and the driving spur gear is meshed with the driven spur gear. A transmission shaft is arranged between the two driving side plates, and a coupling is inserted in a fixed connection manner into an interior of the second driving side plate at an other side away from the input shaft. One end of the transmission shaft is fixedly connected to the driving spur gear, and an other end of the transmission shaft is rotatably connected to an inner end of the coupling through a bearing.

In some embodiments, the driven support leg module includes two driven side plates called a first driven side plate and a second driven side plate. The two driven side plates are located between the two main side plates, and the two driven side plates are fixedly connected to each other through multiple connecting rods. A third tracked wheel is rotatably arranged between an ipsilateral ends of the two driven side plates, and a fourth tracked wheel is rotatably arranged between other ends of the two driven side plates. A driven shaft is arranged between the third tracked wheel and the fourth tracked wheel. Two ends of the driven shaft are inserted in a fixed connection manner into an interior of the two driven side plates and extend out of the two driven side plates. The brake is fixedly arranged on an outer side surface of the first main side plate close to the driven support leg module, and an output shaft of the brake is fixedly connected to one end of the driven shaft. When the brake is in a power-off unlocking state, the driven shaft and the output shaft of the brake can rotate freely. When the brake is in a power-on locking state, the output shaft of the brake and the driven shaft are both unable to rotate freely. One end, close to the brake, of the driven shaft is sleeved with a torsional spring, and two ends of the torsional spring are fixedly connected to the main side plate and the driven side plate, respectively. One end, away from the brake, of the driven shaft extends out of an outside of the second main side plate which is away from the brake.

In some embodiments, the first tracked wheel, the second tracked wheel, the third tracked wheel and the fourth tracked wheel are sleeved with the track, a connecting line between the first tracked wheel and the second tracked wheel is parallel to a connecting line between the third tracked wheel and the fourth tracked wheel, and the track is of a parallelogram ring structure.

In some embodiments, the synchronous belt transmission mechanism includes a driving synchronous pulley, a driven synchronous pulley, and a synchronous belt. The driving synchronous pulley is fixedly arranged at an outer side of one end, away from the driving motor, of the coupling, and the driven synchronous pulley is fixedly arranged at an outer side of one end, away from the brake of the driven shaft; and the driving synchronous pulley and the driven synchronous pulley are sleeved with a synchronous belt.

In some embodiments, the robot main body is of a cylindrical tubular structure, three fixing plates in a circular array are fixedly arranged at each of two ends of an outer cylindrical surface of the robot main body. The three fixing plates at one end of the robot main body are in one-to-one correspondence with the three fixing plates at an other end of the robot main body. A group of center variable-diameter modules is arranged between two corresponding fixing plates; and a control module and a CCD (Charge Coupled Device) camera module are arranged in an interior of the robot main body.

In some embodiments, the center variable-diameter module includes a fixed frame, long rods, short rods, fixed hinges, movable hinges, and springs. The fixed frame is fixedly arranged on the outer side surface of the robot main body between the two corresponding fixing plates. Two fixed hinges are inserted in a rotatable connection manner into a middle part of the fixed frame, and two moving slots symmetric to each other are arranged on the fixed frame in a length direction thereof; and one spring and one movable hinge are arranged in each of the two moving slots. The spring is located at one side, away from the fixed hinge, of the movable hinge, one end of the spring is fixedly connected to one end, away from the fixed hinge, of the moving slot, and an other end of the spring is fixedly connected to the movable hinge.

Furthermore, one long rod is fixedly connected to each of two ends of each movable hinge, one end of the long rod is rotatably connected to an end part of the movable hinge, and an other end of the long rod is rotatably connected to an ipsilateral main side plate. One short rod is rotatably connected to each of two ends of each fixed hinge, one end of the short rod is rotatably connected to an end part of the fixed hinge, and an other end of the short rod is rotatably connected to a middle part of an ipsilateral long rod.

A differential turning method of a deformable tracked pipeline robot includes the following steps:

Step one: capturing a full picture in a pipeline through a CCD camera module at a front end of a pipeline robot;

Step two: preprocessing and analyzing an image captured by the CCD camera module to clearly identify a pipeline axis;

Step three: identifying a boundary of the pipeline by an edge detection algorithm;

Step four: calculating a center axis of the pipeline according to the boundary of the pipeline;

Step five: performing data conversion and output, adding data points by a linear interpolation method to complete a fitting of a space curve;

where a recursive algorithm starts from a set of points obtained by linear interpolation to gradually refine each section to make the section closer to an actual curvature; in every iteration, a position of a curve point is adjusted by the recursive algorithm to better adapt to an actual pipeline shape, a final space curve is formed by connecting a plurality of arc segments with different curvatures, and the arc segments are in close fit with an actual shape of the pipeline axis;

Step six: calculating curvatures at different positions from the space curve, then performing coordinate transformation, namely, transforming image coordinates into actual space coordinates of contact points between the three tracked foot modules of the pipeline robot and the pipeline;

Step seven: calculating an ideal speed of the tracked foot module according to curvature data;

Step eight: accurately adjusting speed through a PID (Proportional-Integral-Derivative) controller, determining target speed of the tracked foot module, where the target speed is calculated according to a curvature of the pipeline, calculating an error between the target speed and actual speed, applying an output of the PID controller to a driver of the tracked foot module to adjust the actual speed of the tracked foot module, and monitoring, adjusting and control the output in real time to ensure that the actual speed of the tracked foot module approaches or reaches a value of the target speed. The PID controller can ensure that the tracked foot module of the pipeline robot is kept at an appropriate speed under different pipeline curvature conditions, thereby optimizing navigation and movement efficiency of the pipeline robot in the pipeline.

Compared with the prior art, the present disclosure produces the following beneficial technical effects:

(1) According to the deformable tracked pipeline robot and a differential turning method thereof provided by the present disclosure, the pipeline robot can measure a bending curvature of a discrete distance of a center axis of the pipeline through the CCD camera module, and the spacing between the discrete positions of the pipeline axis is usually long. By interpolating the curvature of the curve through a linear interpolation method, more data can be obtained, thus improving the accuracy of space curve fitting. After interpolation, a length of the curve between two adjacent points is short, so the space curve can be regarded as the connection of many arcs with different curvatures. The recursive algorithm is configured to obtain position information of each curve point to fit the space curve. By combining the curvature of the pipeline axis measured by the CCD camera module as the space curve, the recursive algorithm is configured to improve the fitting accuracy of the space curve, and the speed of the three tracked foot modules can be accurately adjusted through the fitted space curve, making the pipeline robot smoothly pass through a bend and optimizing the efficiency of the pipeline robot when passing through a turn.

(2) According to the deformable tracked pipeline robot and a differential turning method thereof provided by the present disclosure, three tracked foot modules in a circular array are circumferentially arranged on the outer side surface of the robot main body, each tracked foot module is connected to the robot main body through a center variable-diameter module, and a spacing between the tracked foot module and the robot main body can be adjusted through the center variable-diameter module. The three tracked foot modules can be closely attached to the inner wall of the pipeline through the spring in the center variable-diameter module to ensure sufficient positive pressure between the tracked foot module and the inner wall of the pipeline. An angle of the tracked foot module can be adjusted through two groups of long rods and short rods in the center variable-diameter module, thus making the tracked foot module closely attached to the inner wall of the variable-diameter pipeline. When the pipeline robot advances on the inner wall of a pipeline without obstacles, the track can be driven to run to pass through the pipeline smoothly. When the pipeline robot advances on the inner wall of the pipeline with obstacles, the driving support leg module and the driven support leg module can be driven to rotate at the same time to lift the driving support leg module and the driven support leg module simultaneously, thus passing through the pipeline with obstacles smoothly.

(3) According to the deformable tracked pipeline robot and a differential turning method thereof provided by the present disclosure, three tracked foot modules with a circumferential layout of 120° are adopted to adapt to the geometric constraint in the pipeline, and have good passability for bends and obstacle pipes during operation. In addition, the speed of the tracked foot module is adjusted through a fitting method for measuring a space curve of the pipeline axis, thus controlling the pipeline robot to pass through bends with different curvature radii.

BRIEF DESCRIPTION OF THE DRAWINGS

The present disclosure is further described below with reference to accompanying drawings.

Reference numerals in the drawings: 1—robot main body; 2—tracked foot module; 3—center variable-diameter module;

101—fixing plate; 102—CCD camera module;

21—main side plate; 22—driving support leg module; 23—driven support leg module; 24—synchronous belt transmission mechanism; 25—track;

2201—driving side plate; 2202—first tracked wheel; 2203—second tracked wheel; 2204—driving motor; 2205—driving bevel gear; 2206—driven bevel gear; 2207—input shaft; 2208—driving spur gear; 2209—driven spur gear; 2210—transmission shaft; 2211—coupling;

2301—driven side plate; 2302—third tracked wheel; 2303—fourth tracked wheel; 2304—driven shaft; 2305—brake; 2306—torsional spring; 2307—limit slot; 2308—limit pin;

2401—driving synchronous pulley; 2402—driven synchronous pulley; 2403—idle pulley; 2404—synchronous belt;

301—fixed frame; 302—fixed hinge; 303—moving slot; 304—movable hinge; 305—spring; 306—long rod; 307—short rod; 308—guide wheel.

DETAILED DESCRIPTION OF THE EMBODIMENTS

In order to make the technical problem to be solved by the present disclosure, technical solutions and beneficial effects of the present disclosure more clearly, the present disclosure is further described in detail below with reference to the embodiments and accompanying drawings. It should be understood that specific embodiments described herein are only used to illustrate rather than limiting the present disclosure. The technical solutions of the present disclosure are described in detail below in conjunction with the embodiments and the accompanying drawings, but the scope of protection of the present disclosure is not limited thereby.

As shown in FIG. 1 to FIG. 8, a deformable tracked pipeline robot, and a differential turning method thereof are provided in the present disclosure. The pipeline robot includes a robot main body 1, and three tracked foot modules 2 in a circular array are circumferentially arranged on an outer side surface of the robot main body 1. Each of the three tracked foot modules 2 is connected to the robot main body 1 through a center variable-diameter module 3. A spacing between the tracked foot module 2 and the robot main body 1 is adjusted through the center variable-diameter module 3, making the three tracked foot modules 2 all in contact with an inner wall of the pipeline.

Figure 1:
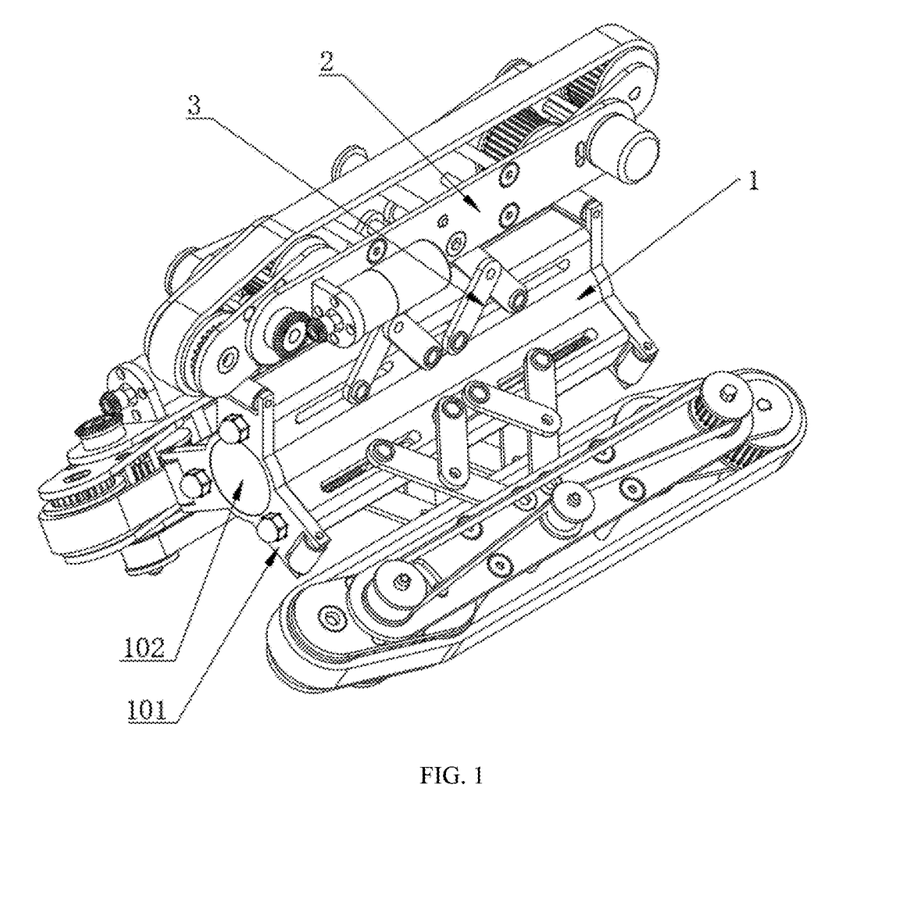
FIG. 1 is an overall structural diagram according to an embodiment of the present disclosure.

The robot main body 1 is of a cylindrical structure, three fixing plates 101 in a circular array are fixedly arranged at each of two ends of an outer cylindrical surface of the robot main body 1, and the fixing plates 101 are perpendicular to an axis of the robot main body 1. The three fixing plates 101 at one end of the robot main body 1 are in one-to-one correspondence with the three fixing plates 101 at the other end of the robot main body 1. A group of center variable-diameter modules 3 is arranged between two corresponding fixing plates 101.

A control module and a CCD camera module 102 are arranged inside the robot main body 1. The CCD camera module 102 is located at a front end surface of the robot main body 1.

Figure 4:
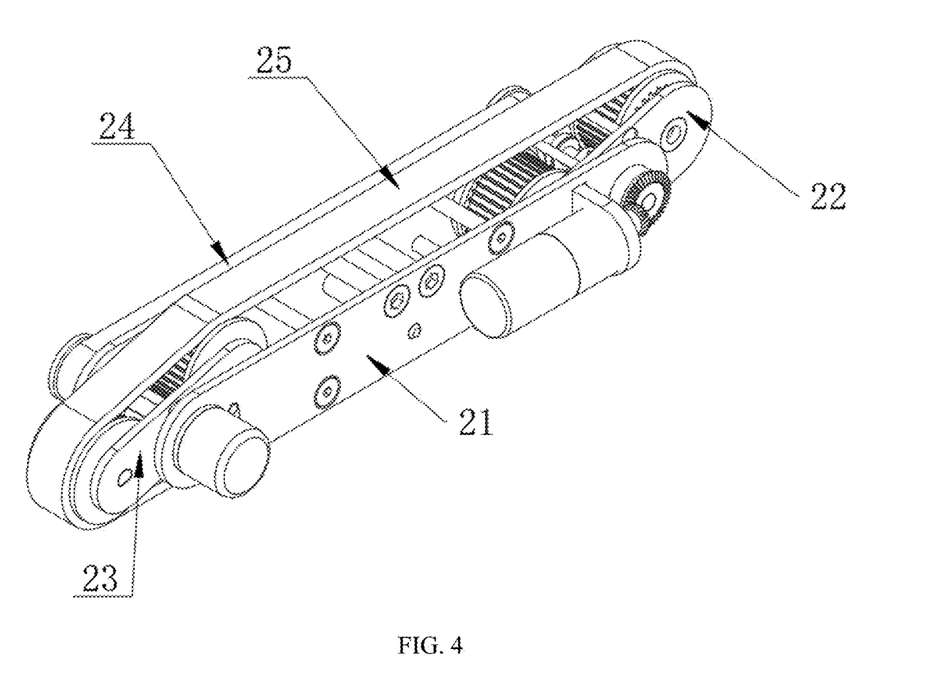
FIG. 4 is a three-dimensional diagram of a tracked foot module according to an embodiment of the present disclosure.
Figure 5:
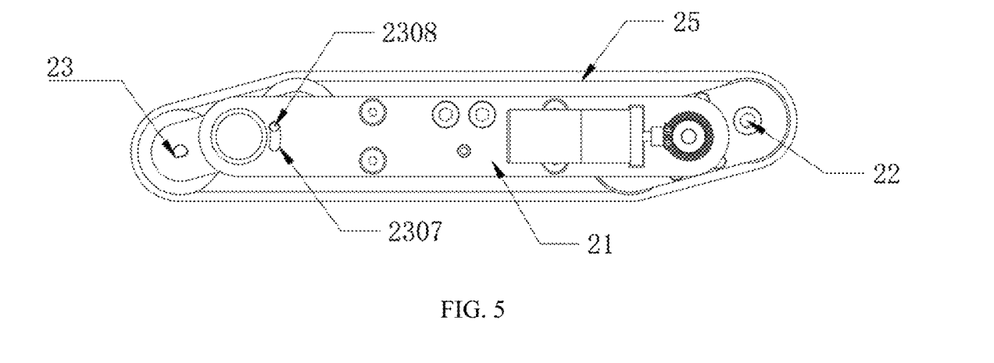
FIG. 5 is a front view of a tracked foot module according to an embodiment of the present disclosure.
Figure 6:
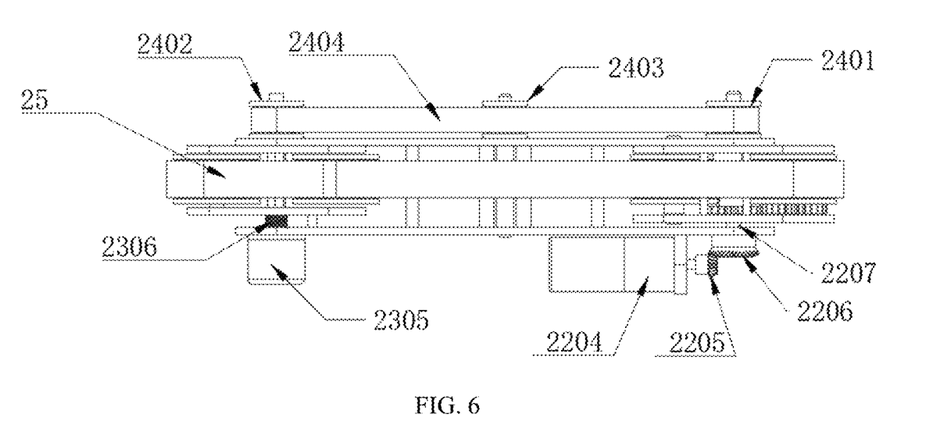
FIG. 6 is a top view of a tracked foot module according to an embodiment of the present disclosure.

Each of the three tracked foot modules 2 includes two main side plate 21 parallel to each other. The two main side plates 21 are parallel to the axis of the robot main body 1, and connected to each other through multiple pairs of mutual-to-block bolts. A driving support leg module 22 is arranged between the two ends of the two main side plates 21, a driven support leg module 23 is arranged between the other ends of the two main side plates 21, and the driving support leg module 22 is connected to the driven support leg module 23 through a synchronous belt transmission mechanism 24. The synchronous belt transmission mechanism 24 is configured to enable the driving support leg module 22 and the driven support leg module 23 to rotate synchronously.

Figure 7:
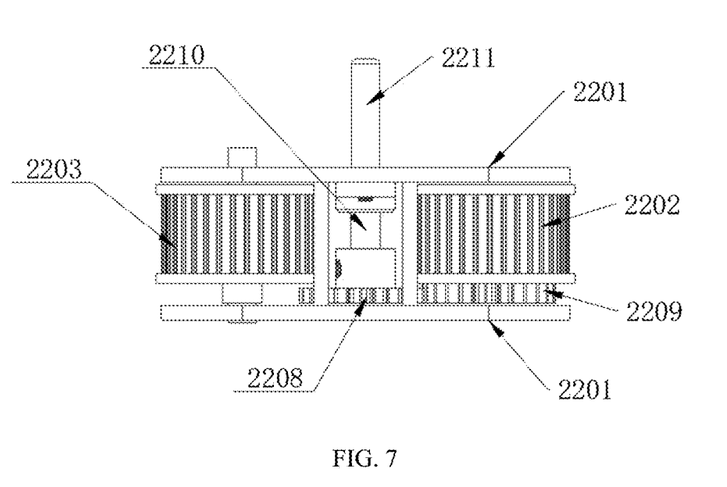
FIG. 7 is a top view of a driving support leg module according to an embodiment of the present disclosure.

The driving support leg module 22 includes two driving side plates 2201 in parallel to each other. The two driving side plates 2201 are located between and parallel to the two main side plates 21, and the two driving side plates 2201 are fixedly connected to each other through multiple connecting rods. A first tracked wheel 2202 is rotatably arranged between the ipsilateral ends of the two driving side plates 2201, and a second tracked wheel 2203 is rotatably arranged between the other ends of the two driving side plates 2201. A driven spur gear 2209 is fixedly arranged on a rotating shaft of the first tracked wheel 2202, and the driven spur gear 2209 is rotated synchronously with the first tracked wheel 2202.

A driving motor 2204 is fixedly arranged on an outer side surface of one main side plate 21 close to the driving support leg module 22. A driving bevel gear 2205 is fixedly arranged on an output shaft of the driving motor 2204. An input shaft 2207 is rotatably arranged on the main side plate 21 on the same side, and the input shaft 2207 is perpendicular to the main side plate 21. A driven bevel gear 2206 is fixedly arranged at an outer end of the input shaft 2207, the driving bevel gear 2205 is meshed with the driven bevel gear 2206, and the driving motor 2204 drives the input shaft 2207 to rotate inside the main side plate 21 through the driving bevel gear 2205 and the driven bevel gear 2206 which are meshed to each other.

An inner end of the input shaft 2207 penetrates through the driving side plate 2201 at the corresponding side to extend into between the two driving side plates 2201. A driving spur gear 2208 is fixedly arranged at the inner end of the input shaft 2207, the driving spur gear 2208 is located between the first tracked wheel 2202 and the second tracked wheel 2203, and the driving spur gear 2208 is meshed with the driven spur gear 2209. A transmission shaft 2210 is arranged between the two driving side plates 2201. A coupling 2211 is inserted in a fixed connection manner into an interior of the driving side plate 2201 at the other side away from the input shaft 2207. Both the coupling 2211 and the transmission shaft 2210 are coaxially arranged with the input shaft 2207. One end of the transmission shaft 2210 is fixedly connected with the driving spur gear 2208, and the other end of the transmission shaft 2210 is rotatably connected with an inner end of the coupling 2211 through a bearing.

Figure 8:
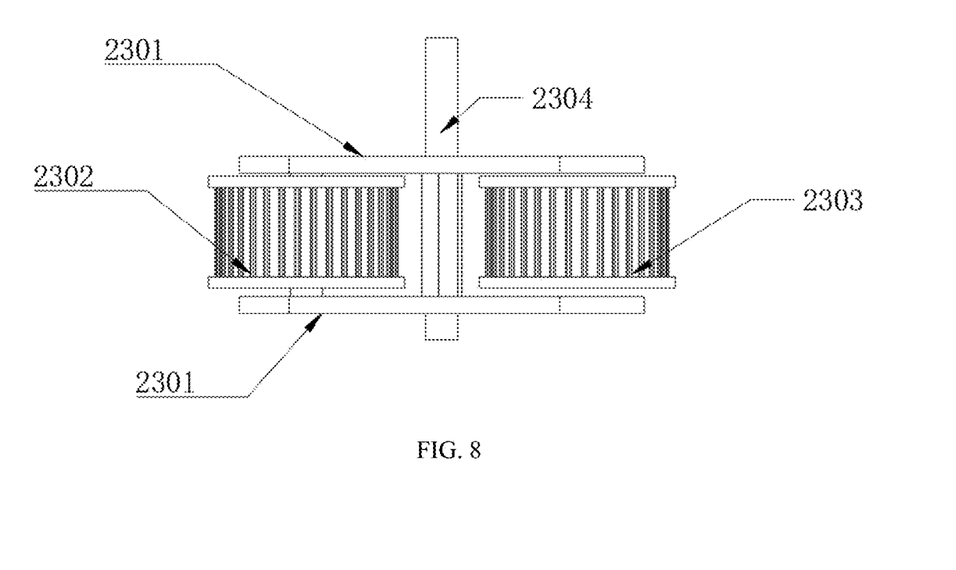
FIG. 8 is a top view of a driven support leg module according to an embodiment of the present disclosure.

The driven support leg module 23 includes two driven side plates 2301 in parallel to each other. The two driven side plates 2301 are located between and parallel to the two main side plates 21, and the two driven side plates 2301 are fixedly connected to each other through multiple connecting rods. A third tracked wheel 2302 is rotatably arranged between the ipsilateral ends of the two driven side plates 2301, and a fourth tracked wheel 2303 is rotatably arranged between the other ends of the two driven side plates 2301.

One driven shaft 2304 is arranged between the third tracked wheel 2302 and the fourth tracked wheel 2303, and the driven shaft 2304 is perpendicular to the two driven side plates 2301. Two ends of the driven shaft 2304 are inserted in a fixed connection manner into an interior of the two driven side plates 2301 and extend out of the two driven side plates 2301. A brake 2305 is fixedly arranged on an outer side surface of one main side plate 21 close to the driven support leg module 23, and an output shaft of the brake 2305 is fixedly connected to one end of the driven shaft 2304. When the brake 2305 is in a power-off unlocking state, the driven shaft 2304 and the output shaft of the brake 2305 can rotate freely. When the brake 2305 is in a power-on locking state, the output shaft of the brake 2305 and the driven shaft 2304 are unable to rotate freely. One end, close to the brake 2305, of the driven shaft 2304 is sleeved with a torsional spring 2306, the torsional spring 2306 is located between the main side plate 21 at one side close to the brake 2305 and the driven side plate 2301, and two ends of the torsional spring 2306 are fixedly connected to the main side plate 21 and the driven side plate 2301, respectively. One end, away from the brake 2305, of the driven shaft 2304 extends to the outside of the main side plate 21 at one side far away from the brake 2305, and the driven shaft 2304 is rotatably connected to the main side plate 21 at one side far away from the brake 2305.

An arc-shaped limit slot 2307 is formed in one of the main side plates 21, and an axis of the limit slot 2307 coincides with an axis of the driven shaft 2304. A limit pin 2308 is fixedly arranged on an outer side surface of the driven side plate 2301 ipsilateral with the main side plate 21. The limit pin 2308 is perpendicular to the driven side plate 2301, and the limit pin 2308 is connected in an insert manner into an interior of the limit slot 2307. Through the mutual fitting of the limit pin 2308 and the limit slot 2307, a relative rotating angle between the driven support leg module 23 and the main side plate 21 can be limited, and the rotating angle of the driven support leg module 23 relative to the main side plate 21 is limited to 15° to −15°.

The first tracked wheel 2202, the second tracked wheel 2203, the third tracked wheel 2302 and the fourth tracked wheel 2303 are sleeved with the same track 25, a connecting line between the first tracked wheel 2202 and the second tracked wheel 2203 is parallel to a connecting line between the third tracked wheel 2303 and the fourth tracked wheel 2303, and thus the track 25 is of a parallelogram ring structure.

The brake 2305 and the driving motor 2204 are arranged on the outer side surface of the same one main side plate 21.

The driving motor 2204 on each tracked foot module 2 is independently controlled.

The synchronous belt transmission mechanism 24 includes a driving synchronous pulley 2401, a driven synchronous pulley 2402, an idle pulley 2403, and a synchronous belt 2404. The driving synchronous pulley 2401 is fixedly arranged at an outer side of one end, away from the driving motor 2204, of the coupling 2211, and the driven synchronous pulley 2402 is fixedly arranged at an outer side of one end, away from the brake 2305, of the driven shaft 2304. The driving synchronous pulley 2401 and the driven synchronous pulley 2402 are sleeved with the synchronous belt 2404. The idle pulley 2403 is rotatably arranged in a middle part of the outer side surface of one main side plate 21 away from the driving motor 2204, and the idle pulley 2403 is in contact with the outer side surface of the synchronous belt 2404.

The center variable-diameter module 3 includes a fixed frame 301, long rods 306, short rods 307, fixed hinges 302, movable hinges 304, and springs 305.

The fixed frame 301 is fixedly arranged on the outer side surface of the robot main body 1 between the two corresponding fixing plates 101, and a length direction of the fixed frame 301 is parallel to an axis of the robot main body 1. Two fixed hinges 302 are rotatably connected in an insert manner into a middle part of the fixed frame 301, and the two fixed hinges 302 are symmetrically arranged relative to a length direction of the fixed frame 301. The fixed hinges 302 are perpendicular to the axis of the robot main body 1, and two ends of each fixed hinge 302 extend out of two ends of the fixed frame 301.

Two symmetric moving slots 303 are formed in the fixed frame 301 in a length direction thereof, and the two symmetric moving slots 303 are located on the same straight line. Two ends of each moving slot 303 are opened, and an extending direction of each the moving slot 303 is parallel to the axis of the robot main body 1. One spring 305 and one movable hinge 304 are arranged in each moving slot 303, the movable hinge 304 is perpendicular to the axis of the robot main body, two ends of the movable hinge 304 extend out of openings at two ends of the moving slot 303, and the movable hinge 304 slides in the moving slot 303 along an extending direction of the moving slot 303. A length direction of the spring 305 is parallel to the extending direction of the moving slot 303, the spring 305 is located at one side, away from the fixed hinge 302, of the movable hinge 304. One end of the spring 305 is fixedly connected to one end, away from the fixed hinge 302, of the moving slot 303, and the other end of the spring 305 is fixedly connected to the movable hinge 304. When the movable hinge 304 moves in the moving slot 303 towards a direction close to the fixed hinge 302, the spring 305 is stretched. When the movable hinge 304 moves in the moving slot 303 towards a direction away from the fixed hinge 302, the spring 305 is compressed.

One long rod 306 is rotatably connected to each of two ends of each movable hinge 304, and two long rods 306 extend towards directions of the two main side plates 21 of the tracked foot module 2, respectively. One end of each long rod 306 is rotatably connected to an end part of the movable hinge 304, and the other end of the long rod 306 is rotatably connected to the main side plate 21 ipsilateral with the long rod 306. A distance between the ends of the two long rods 306 connected to the movable hinge 304 is greater than a distance between the other ends of the two long rods 306 connected to the main side plate 21.

One short rod 307 is rotatably connected to each of two ends of each fixed hinge 302, and two short rods 307 extend towards directions of the ipsilateral long rods 306, respectively. One end of the short rod 307 is rotatably connected to an end part of the fixed hinge 302, and the other end of the short rod 307 is rotatably connected to a middle part of the ipsilateral long rod 306.

A guide wheel 308 is rotatably arranged at an edge at one side, away from the robot main body 1, of each fixing plate 101, and an axis of the guide wheel 308 is perpendicular to the axis of the robot main body 1. When an adjustment angle of the tracked foot module 2 is excessively large, the track 25 on the tracked foot module 2 is in rolling contact with the guide wheel 308 on the corresponding fixing plate 101 to ensure that the track 25 can run smoothly and prevent a situation that the track 25 is locked because the tracked foot module 2 is adjusted to the limit position.

When the pipeline robot runs in an isodiametric pipeline, the robot main body 1 is located at an internal axis of the pipeline, the main side plates 21 of the three tracked foot modules 2 are parallel to the axis of the robot main body 1, and the resilience of the two springs 305 in each center variable-diameter module 3 is kept consistent. The resilience of the two springs 305 are configured to ensure that the track 25 of the tracked foot module 2 is in close contact with the inner wall of the pipeline, such that all three tracked foot modules 2 press the inner wall of the pipeline tightly, thus enabling sufficient positive force between the tracked foot modules 2 and the inner wall of the pipeline, and enabling the pipeline robot can advance in the pipeline smoothly.

When the pipeline robot passes through the inside of the pipeline with variable diameter, the pipeline robot is located at a conical surface, and the robot main body 1 is located at the internal axis of the pipeline, in this case, the main side plates 21 of the three tracked foot modules 2 are parallel to the conical surface, that is, there is an angle between each main side plate 21 of the tracked foot modules 2 and the axis of the robot main body 1. At this time, the two springs 305 inside each center variable-diameter module 3 are different in length and resilience, and the angles between the two long rods 306 of each center variable-diameter module 3 and the fixed frame 301 are different. The track 25 of the tracked foot module 2 is ensured to be in close contact with the inner wall of the conical pipeline through the resilience of the two springs 305, thus enabling the three tracked foot modules 2 to press on the inner walls of the conical pipeline tightly, such that there is enough positive pressure between each the tracked foot module 2 and the inner wall of the pipeline, and enabling the pipeline robot to advance smoothly inside the pipeline.

Figure 2:
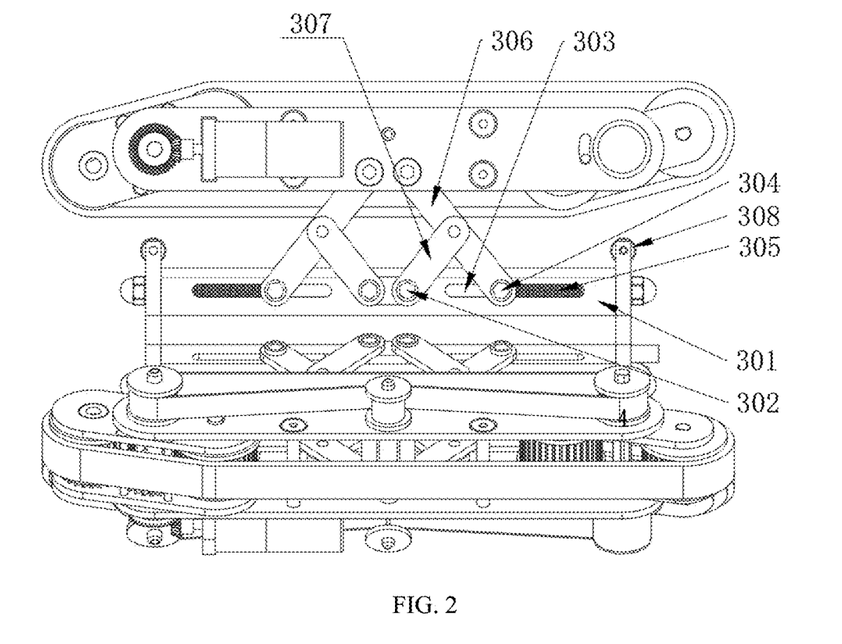
FIG. 2 is a structural diagram of a deformable tracked pipeline robot according to an embodiment of the present disclosure when advancing in a pipeline without an obstacle.

The drive principle of the tracked foot module 2 is as follows:

As shown in FIG. 2, when the pipeline robot advances in a pipeline without an obstacle, there is no need to deform the tracked foot module 2, in this case, the brake 2305 is in a power-on locking state, the driven shaft 2304 and the main side plate 21 cannot rotate relative to each other, and then the driven synchronous pulley 2402 cannot rotate. Due to the limitation of the synchronous belt 2404, the driving synchronous pulley 2401 cannot rotate, that is, the synchronous belt transmission mechanism 24 is in an inoperative state.

The driving motor 2204 drives the input shaft 2207 to rotate through the driving bevel gear 2205 and the driven bevel gear 2206 which are meshed with each other. As the driving synchronous pulley 2401 cannot rotate in this case, the coupling 2211 cannot rotate. As the coupling 2211 is fixedly connected to the driving side plate 2201, the two driving side plates 2201 cannot rotate.

The input shaft 2207 drives the driving spur gear 2208 to rotate. As the driving spur gear 2208 is meshed with the driven spur gear 2209, with the synchronous rotation between the driven spur gear 2209 and the first tracked wheel 2202, the first tracked wheel 2202 drives the track 25 to rotate, the track 25 drives the second tracked wheel 2203, the third tracked wheel 2302 and the fourth tracked wheel 2303 to rotate synchronously, thus enabling that the track 25 which is closely attached to the inner wall of the pipeline can drive the pipeline robot to advance as a whole.

Figure 3:
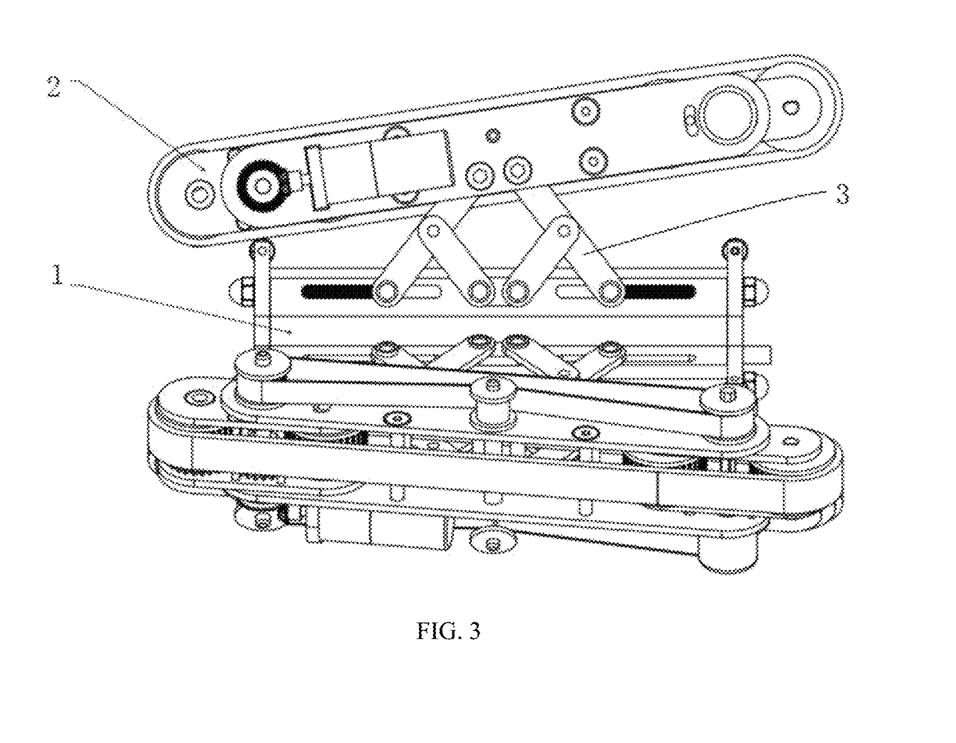
FIG. 3 is a structural diagram of a deformable tracked robot according to an embodiment of the present disclosure when advancing in a pipeline with an obstacle.

The deformation principle of the tracked foot module 2 is as follows:

As shown in FIG. 3, as welds in the pipeline will exist on the inner wall of the pipeline and protrude from the inner wall of the pipeline to form obstacles, and the deposition of various impurities in the pipeline will also form uneven inner surface, therefore it is required that the pipeline robot can adapt to and cross obstacles smoothly.

When facing the obstacles on the inner wall of the pipeline, the brake 2305 is in a power-off unlocking state, the driven shaft 2304 can rotate relative to the main side plate 21, then the driven synchronous pulley 2402 can rotate along with the driven shaft 2304, and the driving synchronous pulley 2401 can also rotate along with the driven shaft 2304 through the synchronous belt 2404, and in this case, the synchronous belt transmission mechanism 24 is in an operating state.

The driving motor 2204 drives the input shaft 2207 to rotate through the driving bevel gear 2205 and the driven bevel gear 2206 which are meshed with each other. As the driving synchronous pulley 2401 can rotate, the coupling 2211 can rotate. As the coupling 2211 is fixedly connected to the driving side plate 2201, the two driving side plates 2201 can rotate together with the coupling 2211 and the driving synchronous pulley 2401.

The input shaft 2207 drives the driving spur gear 2208 to rotate. As the driving spur gear 2208 is meshed with the driven spur gear 2209, the driven spur gear 2209 as a planetary gear rotates around the driving spur gear 2208, the driven spur gear 2209 drives the two driving side plates 2201 to rotate around the transmission shaft 2210, and the whole driving support leg module 22 rotates around the transmission shaft 2210, thus achieving the synchronous lifting and obstacle-crossing of the driving support leg module 22.

The driving side plate 2201, when rotating, drives the driving synchronous pulley 2401 to rotate together through the coupling 2211, the driving synchronous pulley 2401 drives the driven synchronous pulley 2402 to rotate through the synchronous belt 2404, and the driven synchronous pulley 2402 drives the whole driven support leg module 23 to rotate together, thus achieving the synchronous lifting and obstacle-crossing of the driven support leg module 23.

Due to the mutual fitting of the limit pin 2308 and the limit slot 2307, lifting angles of the driving support leg module 22 and the driven support leg module 23 are limited.

In the obstacle-crossing process, the torsion spring 2306 provides a torsion force for the driving support leg module 22, such that an auxiliary obstacle-crossing force is provided when the center of gravity of the pipeline robot passes through the obstacle, enabling the pipeline robot to pass through the obstacle easier.

Figure 9:
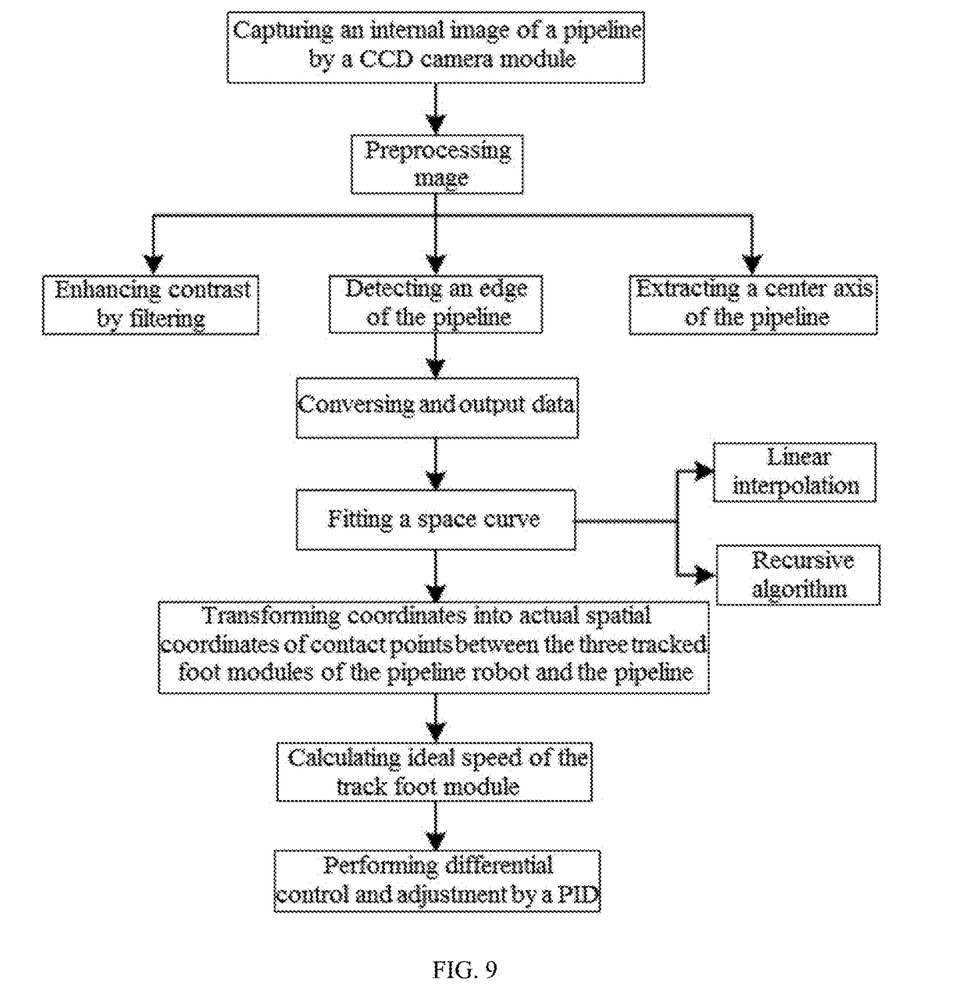
FIG. 9 is a flowchart of working principle according to an embodiment of the present disclosure.

As shown in FIG. 9, when the deformable tracked pipeline robot operates within the pipeline, the inside of the pipeline is a complex three-dimensional geometric constraint, the complex pipeline is typical with a circular bend, and different bent pipes have different curvature radii in practical applications. Therefore, a differential turning method of a deformable tracked pipeline robots is provided, which includes the following steps.

Step one: a CCD camera module 102 is installed at a front end of a robot main body 1 of the deformable tracked pipeline robot, and the CCD camera module 102 faces an inner wall of the pipeline and can capture a full picture of the inside of the pipeline.

Step two: an image captured by the CCD camera module 102 is preprocessed and analyzed, where the image preprocessing includes filtering and contrast enhancement, thus clearly identifying a pipeline axis.

Step three: a boundary of the pipeline is identified by an edge detection algorithm, specifically a Canny edge detection algorithm.

Step four: a center axis of the pipeline is calculated according to the boundary of the pipeline.

Step five: after data conversion and output, the collected center axis of the pipeline is at discrete positions, and when a spacing between curves is long, the fitting of space curves directly with these points will lead to the loss of detailed information, resulting in insufficient accuracy.

Therefore, data points are added by linear interpolation method, and a new data point is interpolated between every two discrete points. Setting that the bending curvatures of two adjacent measuring points n and n+1 are $a_n$ and $a_{n+1}$, respectively, torsional angles of the two adjacent measuring points n and n+1 are $\beta_n$ and $\beta_{n+1}$, respectively, and each small arc length is $l_n$. The bending curvature and the torsional angle at the interpolation point are $a(n)=((a_{n+1}-a_n) l/l_n)+a_n$ and $\beta(s)=(((\beta_{n+1}-\beta_n)l)/l_n)+\beta_n$, respectively, where/is the small arc length from point n to the interpolation point. Assuming that a curve length ds between two adjacent points after interpolation is very small, the space curve can be regarded as the connection of many arcs ds with different curvatures in different contact planes. Any curve in space is $O_iO_{i+1}$, setting that a bending curvature at $O_i$ is $a_i$, and a bending angle of the curve is $\varphi_i=a_i ds$. A vector $\vec{r}_{i0}$ can represent a vector of a first interpolation point, and the bending curvature is 0, $\vec{r}_{i0} = [0, 0, ds, 1]^T$. When the curvature is not 0, it can be expressed as $\vec{r}_{i0} = [0,(1-\cos\alpha_i)/\beta_i, \sin\varphi_i/\beta_i, 1]^T$. In the global coordinate system $\{x, y, z\}$, a motion coordinate system $\{x_i, y_i, z_i\}$ is established at an $i^{-th}$ point of the space curve. The motion coordinate system $\{x_i, y_i, z_i\}$ is defined as $\{C_i\}$, the global coordinate system $\{x, y, z\}$ is defined as $\{C\}$, and $M_i$ is defined as a homogeneous transformation matrix from the global coordinate system $\{C\}$ to the motion coordinate system $\{C_i\}$, then $\{C_i\}=[M_i]\{C\}$.

Vectors $\vec{r}_{i_{i1}}$, $\vec{r}_i$ and $\vec{R}_i$ respectively represent the expressions of vectors $\overline{O_0O_{i-1}}$, $\overline{O_0O_i}$ and $\overline{O_0O_{i+1}}$ in the global coordinate system. Therefore, $\vec{r}_{i+1} = \vec{r}_i + \vec{R}_i$. In the recursive algorithm, if the vector $\vec{r}_i$ and the matrix $M_i$ are known, the vector $\vec{R}_i = [M_i]^{-1} \cdot \vec{r}_{i0}$, and the vector $\vec{r}_{i_{i1}}$ can be calculated in the global coordinate system $\{C\}$ in turn. To calculate the positions of point $O_{i+1}$ and point $O_{i+2}$ according to the above formula, it is necessary to establish a $\{C_{i+1}\}$ coordinate system and a homogeneous transformation matrix from the coordinate system $\{C_i\}$ to the coordinate system $\{C_{i+1}\}$.

A change matrix of a bending angle is as follows:

$$[R(x_i, -\phi_i)] = \begin{bmatrix} 1 & 0 & 0 & 0 \\ 0 & \cos\phi_i & \sin\phi_i & 0 \\ 0 & -\sin\phi_i & \cos\phi_i & 0 \\ 0 & 0 & 0 & 1 \end{bmatrix}$$

A change matrix of the torsional angle is as follows:

$$[R(z_i, -\beta_i)] = \begin{bmatrix} \cos\beta_i & -\sin\beta_i & 0 & 0 \\ \sin\beta_i & \cos\beta_i & 0 & 0 \\ 0 & 0 & 1 & 0 \\ 0 & 0 & 0 & 1 \end{bmatrix}$$

A homogeneous transformation matrix $\{R_{i+1}\}$ of direction transformation from the global coordinate system $\{C_i\}$ to $\{C_{i+1}\}$ can be calculated, $[R_{i+1}]=[R(x_i,-\phi_i)][R(z_i,\beta_i)]$. Similarly, $\{C_{i+1}\}=\{R_{i+1}\}\{C_i\}$, the global coordinate system $\{C_i\}$ to $\{C_{i+1}\}$ is the homogeneous transformation matrix $M_{i+1}$ after coordinate transformation, $\{C_{i+1}\}=\{M_{i+1}\}\{C_i\}$, then the matrix $M_{i+1}$ can be expressed as: $\{C_{i+1}\}=[M_{i+1}]\{C\}$. When i=0, the global coordinate system $\{C\}$ coincides with the motion coordinate system $\{C_0\}$, then $[M_i]$=I, and/is a 4×4 identity matrix. Then, the positions of the point $O_{i+1}$ in the global coordinate system $\{C_i\}$ and the motion coordinate system $\{C_{i+1}\}$ can be obtained. By repeating the above steps, the position information of each point on the space curve in the global coordinate system $\{C\}$ can be obtained, and the fitting of the space curve can be completed.

A recursive algorithm is configured for the fitting of the space curve: after linear interpolation, although there are more data points, a straight line segment cannot accurately express the actual curve shape. The recursive algorithm is configured to further improve the accuracy of fitting. The recursive algorithm starts with a set of points obtained by linear interpolation, and gradually refines each section to make the section closer to the actual curvature. In each iteration, a position of a curve point is adjusted by the algorithm to better adapt to an actual pipeline shape, a final space curve is formed by connecting multiple arc segments with different curvatures, and these arc segments are in close fit with an actual shape of the pipeline axis.

Step six: curvatures at different points can be calculated from the above space curve, then coordinate transformation is performed, namely, the image coordinates are transformed into actual space coordinates of contact points between the three tracked foot modules 2 of the pipeline robot and the pipeline.

Step seven: ideal speed of the tracked foot module 2 is calculated according to curvature data. In general, the greater the curvature, the tighter the bend, and the speed of the tracked foot module 2 at the inner side should be lower. A derived mathematical formula is used to determine the speed of each tracked foot module 2, and perform differential control on the three tracked foot modules 2 to ensure that the pipeline robot can move smoothly along a predetermined path. The speed of the tracked foot module 2 at the inner side is lower than that of the tracked foot module 2 at an outer side, thus achieving effective turning. The speed of the track 25 is adjusted according to the real-time feedback data to adapt to the change of the pipeline shape.

Step eight: the speed is accurately regulated by using a PID controller, target speed of the tracked foot module 2 is determined at first, and the speed is calculated according to the curvature of the pipeline, an error between the target speed and the actual speed is calculated, an output of the PID controller is applied to a driver of the tracked foot module 2 to adjust the speed of the tracked foot module 2, and the output is monitored, adjusted and controlled in real time to ensure that the speed of the tracked foot module 2 approaches or reaches a target value. In this way, the PID controller can ensure that the tracked foot module 2 of the pipeline robot is kept at an appropriate speed under different pipeline curvature conditions, thereby optimizing navigation and movement efficiency of the pipeline robot in the pipeline.

It is apparent to those skilled in the art that the present disclosure is not limited to the details of the above exemplary embodiments and can be implemented in other specific forms without departing from the spirit or basic characteristics of the present disclosure. Therefore, the embodiments should be considered as exemplary and non-restrictive in all aspects, and the scope of the present disclosure is defined by the appended claims rather than the above description, so it is intended to embrace all changes that fall within the meaning and range of equivalents of the claims. Any reference numerals in the claims should not be regarded as limiting the claims involved.

What is claimed is:

1. A deformable tracked pipeline robot, comprising a robot main body (1), wherein three tracked foot modules (2) in a circular array are circumferentially arranged on an outer side surface of the robot main body (1); each of the three tracked foot modules (2) is connected to the robot main body (1) through a center variable-diameter module (3), and a spacing between said each of the three tracked foot modules (2) and the robot main body (1) is adjusted through the center variable-diameter module (3), making the three tracked foot modules (2) all in contact with an inner wall of the pipeline;

wherein each of the three tracked foot modules (2) comprises two main side plates (21) called a first main side plate and a second main side plate parallel to each other; a driving support leg module (22) is arranged between two ends of the two main side plates (21), a driven support leg module (23) is arranged between another ends of the two main side plates (21), and the driving support leg module (22) is connected to the driven support leg module (23) through a synchronous belt transmission mechanism (24); tracked wheels are arranged in interiors of both the driving support leg module (22) and the driven support leg module (23); the tracked wheels of the driving support leg module (22) and the driven support leg module (23) are sleeved with a same track (25); a driving motor (2204) is arranged on the first main side plate (21) at the driving support leg module (22), and a brake (2305) is arranged on the first main side plate (21) at the driven support leg module (23);

when the brake (2305) is in a power-on locking state, the synchronous belt transmission mechanism (24) stops running, and the driving motor (2204) controls the tracked wheel inside the driving support leg module (22) to rotate to drive the track (25) to run; when the brake (2305) is in a power-off unlocking state, the synchronous belt transmission mechanism (24) starts running, and the driving motor (2204) controls the driving support leg module (22) to rotate integrally, and the driving support leg module (22) drives the driven support leg module (23) to rotate synchronously through the synchronous belt transmission mechanism (24);

wherein the driving support leg module (22) comprises two driving side plates (2201) called a first driving side plate and a second driving side plate; the two driving side plates (2201) are located between the two main side plates (21), and the two driving side plates (2201) are fixedly connected to each other through a plurality of connecting rods; a first tracked wheel (2202) is rotatably arranged between ends of the two driving side plates (2201), and a second tracked wheel (2203) is rotatably arranged between other ends of the two driving side plates (2201); a driven spur gear (2209) is fixedly arranged on a rotating shaft of the first tracked wheel (2202), and a driven spur gear (2209) rotates synchronously with the first tracked wheel (2202);

the driving motor (2204) is fixedly arranged on an outer side surface of the first main side plate (21) close to the driving support leg module (22), and a driving bevel gear (2205) is fixedly arranged at an output shaft of the driving motor (2204); an input shaft (2207) is rotatably arranged at the first main side plate (21), a driven bevel gear (2206) is fixedly arranged at an outer end of the input shaft (2207), and the driving bevel gear (2205) is meshed with the driven bevel gear (2206);

wherein an inner end of the input shaft (2207) extends between the two driving side plates (2201), a driving spur gear (2208) is fixedly arranged at the inner end of the input shaft (2207), and the driving spur gear (2208) is meshed with the driven spur gear (2209); a transmission shaft (2210) is arranged between the two driving side plates (2201), and a coupling (2211) is inserted in a fixed connection manner into an interior of the second driving side plate (2201) at an other side away from the input shaft (2207); and one end of the transmission shaft (2210) is fixedly connected to the driving spur gear (2208), and an other end of the transmission shaft (2210) is rotatably connected to an inner end of the coupling (2211) through a bearing;

wherein the driven support leg module (23) comprises two driven side plates (2301) called a first driven side plate and a second driven side plate; the two driven side plates (2301) are located between the two main side plates (21), and the two driven side plates (2301) are fixedly connected to each other through a plurality of connecting rods; a third tracked wheel (2302) is rotatably arranged between an ipsilateral ends of the two driven side plates (2301), and a fourth tracked wheel (2303) is rotatably arranged between other ends of the two driven side plates (2301); a driven shaft (2304) is arranged between the third tracked wheel (2302) and the fourth tracked wheel (2303); two ends of the driven shaft (2304) are inserted in a fixed connection manner into an interior of the two driven side plates (2301) and extend out of the two driven side plates (2301); the brake (2305) is fixedly arranged on an outer side surface of the first main side plate (21) close to the driven support leg module (23), and an output shaft of the brake (2305) is fixedly connected to one end of the driven shaft (2304); when the brake (2305) is in a power-off unlocking state, the driven shaft (2304) and the output shaft of the brake (2305) are able to rotate freely; when the brake (2305) is in a power-on locking state, the output shaft of the brake (2305) and the driven shaft are both unable to rotate freely; one end, close to the brake (2305), of the driven shaft (2304) is sleeved with a torsional spring (2306), and two ends of the torsional spring (2306) are fixedly connected to the main side plate (21) and the driven side plate (2301), respectively; and one end, away from the brake (2305), of the driven shaft (2304) extends out of an outside of the second main side plate (21) which is away from the brake (2305).

2. The deformable tracked pipeline robot according to claim 1, wherein the first tracked wheel (2202), the second tracked wheel (2203), the third tracked wheel (2302) and the fourth tracked wheel (2303) are sleeved with the track (25), a connecting line between the first tracked wheel (2202) and the second tracked wheel (2203) is parallel to a connecting line between the third tracked wheel (2303) and the fourth tracked wheel (2303), and the track (25) is of a parallelogram ring structure.

3. The deformable tracked pipeline robot according to claim 2, wherein the synchronous belt transmission mechanism (24) comprises a driving synchronous pulley (2401), a driven synchronous pulley (2402), and a synchronous belt (2404); the driving synchronous pulley (2401) is fixedly arranged at an outer side of one end, away from the driving motor (2204), of the coupling (2211), the driven synchronous pulley (2402) is fixedly arranged at an outer side of one end, away from the brake (2305), of the driven shaft (2304); and the driving synchronous pulley (2401) and the driven synchronous pulley (2402) are sleeved with the synchronous belt (2404).

4. The deformable tracked pipeline robot according to claim 1, wherein the robot main body (1) is of a cylindrical tubular structure, three fixing plates (101) in a circular array are fixedly arranged at each of two ends of an outer cylindrical surface of the robot main body (1); the three fixing plates (101) at one end of the robot main body (1) are in one-to-one correspondence with the three fixing plates (101) at an other end of the robot main body (1); a group of center variable-diameter modules (3) is arranged between two corresponding fixing plates (101); and a control module and a CCD (Charge Coupled Device) camera module (102) are arranged in an interior of the robot main body (1).

5. The deformable tracked pipeline robot according to claim 4, wherein the center variable-diameter module (3) comprises a fixed frame (301), long rods (306), short rods (307), fixed hinges (302), movable hinges (304), and springs (305); the fixed frame (301) is fixedly arranged on the outer side surface of the robot main body (1) between the two corresponding fixing plates (101); two fixed hinges (302) are inserted in a rotatable connection manner into a middle part of the fixed frame (301), and two moving slots (303) symmetric to each other are arranged on the fixed frame (301) in a length direction thereof; and one spring (305) and one movable hinge (304) are arranged in each of the two moving slots (303); the spring (305) is located at one side, away from the fixed hinge (302), of the movable hinge (304), one end of the spring (305) is fixedly connected to one end, away from the fixed hinge (302), of the moving slot (303), and an other end of the spring (305) is fixedly connected to the movable hinge (304).

6. The deformable tracked pipeline robot according to claim 5, wherein one long rod (306) is fixedly connected to each of two ends of each movable hinge (304), one end of the long rod (306) is rotatably connected to an end part of the movable hinge (304), and an other end of the long rod (306) is rotatably connected to an ipsilateral main side plate (21); one short rod (307) is rotatably connected to each of two ends of each fixed hinge (302), one end of the short rod (307) is rotatably connected to an end part of the fixed hinge (302), and an other end of the short rod (307) is rotatably connected to a middle part of an ipsilateral long rod (306).

* * * * *